United States Patent
Ota et al.

(10) Patent No.: US 12,403,647 B2
(45) Date of Patent: Sep. 2, 2025

(54) PHOTO FABRICATION RESIN COMPOSITION, MODEL MATERIAL COMPOSITION, AND PHOTO-CURED PRODUCT THEREOF, AND PHOTO FABRICATION COMPOSITION SET

(71) Applicant: Maxell, Ltd., Kyoto (JP)

(72) Inventors: Hiroshi Ota, Kyoto (JP); Katsuyuki Kito, Kyoto (JP)

(73) Assignee: MAXELL, LTD., Kyoto (JP)

( * ) Notice: Subject to any disclaimer, the term of this patent is extended or adjusted under 35 U.S.C. 154(b) by 625 days.

(21) Appl. No.: 17/637,926

(22) PCT Filed: Sep. 10, 2020

(86) PCT No.: PCT/JP2020/034322
§ 371 (c)(1),
(2) Date: Feb. 24, 2022

(87) PCT Pub. No.: WO2021/049576
PCT Pub. Date: Mar. 18, 2021

(65) Prior Publication Data
US 2022/0281157 A1 Sep. 8, 2022

(30) Foreign Application Priority Data

Sep. 12, 2019 (JP) ................. 2019-166550

(51) Int. Cl.
| | | |
|---|---|---|
| C08F 2/46 | (2006.01) | |
| B29C 64/112 | (2017.01) | |
| B29C 64/40 | (2017.01) | |
| B33Y 70/00 | (2020.01) | |
| B33Y 80/00 | (2015.01) | |
| C08F 2/50 | (2006.01) | |
| C08G 61/04 | (2006.01) | |
| C08L 33/06 | (2006.01) | |
| C08L 79/04 | (2006.01) | |
| B29K 105/24 | (2006.01) | |

(52) U.S. Cl.
CPC .......... *B29C 64/112* (2017.08); *B29C 64/40* (2017.08); *B33Y 70/00* (2014.12); *B33Y 80/00* (2014.12); *C08L 33/06* (2013.01); *C08L 79/04* (2013.01); *B29K 2105/24* (2013.01)

(58) Field of Classification Search
CPC ....... B29C 64/112; B29C 64/40; C08L 79/04; C08L 33/06; B33Y 80/00; B33Y 70/00; B29K 2105/24; C08F 220/1811; C08F 220/58; C08F 222/102; C08F 222/103; C08F 222/1063; C08F 216/125; C08F 230/085
USPC ......................... 522/152, 151, 150, 1; 520/1
See application file for complete search history.

(56) References Cited

U.S. PATENT DOCUMENTS

| | | | |
|---|---|---|---|
| 2006/0008222 A1* | 1/2006 | Takase | G02B 6/1221 385/129 |
| 2019/0002616 A1* | 1/2019 | Spagnola | C09D 175/16 |
| 2020/0157258 A1 | 5/2020 | Saitoh et al. | |
| 2020/0282636 A1 | 9/2020 | Nishimoto et al. | |
| 2020/0291161 A1 | 9/2020 | Kito et al. | |

FOREIGN PATENT DOCUMENTS

| | | |
|---|---|---|
| EP | 2960718 A1 | 12/2015 |
| JP | 2004-059601 A | 2/2004 |
| JP | 2004-334152 A | 11/2004 |
| JP | 2016-020474 A | 2/2016 |
| JP | 2016-160372 A | 9/2016 |
| JP | 2017-165804 A | 9/2017 |
| JP | 2020-083949 A | 6/2020 |
| WO | 2019/102695 A1 | 5/2019 |

OTHER PUBLICATIONS

International Search Report and Written Opinion dated Dec. 1, 2020, for PCT/JP2020/034322. 5 pages.
International Preliminary Report on Patentability dated Mar. 15, 2022, for PCT/JP2020/034322. 12 pages.

* cited by examiner

*Primary Examiner* — Jessica Whiteley
(74) *Attorney, Agent, or Firm* — Rimon P.C.

(57) ABSTRACT

The present invention relates to a resin composition for optical shaping, comprising a polymerizable compound, wherein the polymerizable compound comprises: at least one polyfunctional ethylenically unsaturated monomer (B) having a ring structure other than an isocyanurate ring structure; and at least one polyfunctional ethylenically unsaturated monomer (C) having an isocyanurate ring structure, and a content of the monomer (C) is 5 to 80 parts by mass based on 100 parts by mass of the resin composition for optical shaping, and a content of a monofunctional ethylenically unsaturated monomer (A) is less than 70 parts by mass based on 100 parts by mass of the resin composition for optical shaping.

12 Claims, No Drawings

PHOTO FABRICATION RESIN COMPOSITION, MODEL MATERIAL COMPOSITION, AND PHOTO-CURED PRODUCT THEREOF, AND PHOTO FABRICATION COMPOSITION SET

CROSS REFERENCE TO RELATED APPLICATIONS

This application is the U.S. National Phase under 35 U.S.C. § 371 of International Application No. PCT/JP2020/034322, filed on Sep. 10, 2020, which claims the benefit of Japanese Application No. 2019-166550, filed on Sep. 12, 2019, the entire contents of which are hereby incorporated by reference.

TECHNICAL FIELD

The present patent application claims Paris Convention priority based on Japanese Patent Application No. 2019-166550 (filed Sep. 12, 2019), which is incorporated herein by reference in its entirety.

The present invention relates to a resin composition for optical shaping to be used in an optical shaping method, and a photocured product of the resin composition for optical shaping. In addition, the present invention also relates to a model material composition to be used in a material-jet optical shaping method, a photocured product of the model material composition, and a composition set for material-jet optical shaping comprising the model material composition.

BACKGROUND ART

Conventionally, there has been widely known a method for fabricating a three-dimensionally shaped article by continuously forming a cured layer having a prescribed shape by irradiating a photocurable resin composition with ultraviolet rays or the like. As an optical shaping method, for example, an optical shaping method by a liquid tank photopolymerization method in which a liquid photocurable resin is irradiated with light such as an ultraviolet rays and cured layer by layer to laminate, and an optical shaping method by a material-jet method (an ink-jet method) (hereinafter, also referred to as "material-jet optical shaping method") in which a photocurable resin composition is discharged from a material jetting nozzle, and immediately thereafter the resin composition is irradiated with light such as ultraviolet rays to cure, thereby laminating cured layers having a prescribed shape to fabricate a three-dimensionally shaped article are known. In particular, the material-jet optical shaping method has widely attracted attentions as a shaping method that can be realized by a 3D printer capable of freely fabricating a three-dimensionally shaped article based on CAD (Computer Aided Design) data. As a model material composition that can be used for such a material-jet optical shaping method, for example, Patent Document 1 discloses a model material composition comprising a monofunctional ethylenically unsaturated monomer (A) having no urethane group, a polyfunctional ethylenically unsaturated monomer (B) having no urethane group, an ethylenically unsaturated monomer (C) having a urethane group, and a photopolymerization initiator (D), wherein the homopolymers of the monomers (A) and (B) each have a prescribed glass transition temperature.

PRIOR ART DOCUMENTS

Patent Documents

Patent Document 1: JP-A-2016-20474

SUMMARY OF THE INVENTION

Problems to be Solved by the Invention

In recent years, a photocured product of a resin composition for optical shaping to be used in an optical shaping method, especially a photocured product of a model material composition to be used in a material-jet optical shaping method (hereinafter, also referred to as "model material") is expected to be used, for example, as a member for a printed circuit board of an electronic device in a high temperature environment exceeding 100° C. For example, as described in Patent Document 1, a method for improving the heat resistance of a model material has heretofore been proposed, but the heat resistance under a more severe temperature environment is not necessarily sufficient. For this reason, when exposed to a high temperature environment, a dimensional change due to thermal expansion is likely to occur, and it has been found that, in order to apply to the above-described applications, there is required high heat resistance with which a dimensional change due to thermal expansion at a temperature higher than conventionally required is less likely to occur.

Accordingly, an object of the present invention is to provide a resin composition for optical shaping capable of forming a photocured product which has high heat resistance, is hardly thermally expanded even in a high temperature environment, and can maintain high dimensional stability.

Solutions to the Problems

As a result of intensive studies to solve the above problems, the present inventors have accomplished the present invention.

That is, the present invention provides the following preferred embodiments.

[1] A resin composition for optical shaping,
comprising a polymerizable compound,
wherein the polymerizable compound comprises:
at least one polyfunctional ethylenically unsaturated monomer (B) having a ring structure other than an isocyanurate ring structure; and
at least one polyfunctional ethylenically unsaturated monomer (C) having an isocyanurate ring structure, and
a content of the monomer (C) is 5 to 80 parts by mass based on 100 parts by mass of the resin composition for optical shaping, and a content of a monofunctional ethylenically unsaturated monomer (A) is less than 70 parts by mass based on 100 parts by mass of the resin composition for optical shaping.

[2] The resin composition for optical shaping according to [1], wherein the polymerizable compound further comprises at least one monofunctional ethylenically unsaturated monomer (A).

[3] The resin composition for optical shaping according to [1] or [2], wherein a content of the monomer (A) is 59 parts by mass or less based on 100 parts by mass of the resin composition for optical shaping.

[4] The resin composition for optical shaping according to any one of [1] to
[3], wherein a content of the monomer (B) is 5 to 65 parts by mass based on 100 parts by mass of the resin composition for optical shaping.
[5] A model material composition to be used in a material-jet optical shaping method, the model material composition comprising, each based on 100 parts by mass of the model material composition:
19 to 59 parts by mass of at least one monofunctional ethylenically unsaturated monomer (A);
5 to 50 parts by mass of at least one polyfunctional ethylenically unsaturated monomer (B) having a ring structure other than an isocyanurate ring structure; and
5 to 50 parts by mass of at least one polyfunctional ethylenically unsaturated monomer (C) having an isocyanurate ring structure.
[6] The model material composition according to [5], wherein the at least one polyfunctional ethylenically unsaturated monomer (B) having a ring structure other than an isocyanurate ring structure is a polyfunctional ethylenically unsaturated monomer having an alicyclic structure.
[7] The model material composition according to [5] or [6], wherein a homopolymer of the monofunctional ethylenically unsaturated monomer (A) has a glass transition temperature Tg of 80° C. or higher.
[8] The model material composition according to any one of [5] to [7], wherein a homopolymer of the polyfunctional ethylenically unsaturated monomer (B) having a ring structure other than an isocyanurate ring structure has a linear expansion coefficient of 200 ppm or less as measured at a temperature equal to or lower than a glass transition temperature of the homopolymer, in accordance with JIS K 7197.
[9] The model material composition according to any one of [5] to [8], wherein a homopolymer of the polyfunctional ethylenically unsaturated monomer (C) having an isocyanurate ring structure has a linear expansion coefficient of 200 ppm or less as measured at a temperature equal to or lower than a glass transition temperature of the homopolymer, in accordance with JIS K 7197.
[10] The model material composition according to any one of [5] to [9], further comprising 1 to 15 parts by mass of a photopolymerization initiator (D) based on 100 parts by mass of the model material composition.
[11] The model material composition according to any one of [5] to [10], further comprising 0.005 to 3 parts by mass of a surface adjusting agent (E) based on 100 parts by mass of the model material composition.
[12] The model material composition according to any one of [5] to [11], further comprising 0.05 to 3 parts by mass of a preservation stabilizer (F) based on 100 parts by mass of the model material composition.
[13] A photocured product of the resin composition for optical shaping according to any one of [1] to [4] or the model material composition according to any one of [5] to [12].
[14] The photocured product according to [13], wherein a linear expansion coefficient measured at a glass transition temperature or lower in accordance with JIS K 7197 is 150 ppm or less.
[15] A composition set for material-jet optical shaping comprising the model material composition according to any one of [5] to [12] and a support material composition to be used together with the model material composition.

Effects of the Invention

According to the present invention, it is possible to provide a resin composition for optical shaping capable of forming a photocured product which has high heat resistance, hardly undergoes thermal expansion even in a high temperature environment, and maintains high dimensional stability, by an optical shaping method, and a photocured product thereof.

EMBODIMENTS OF THE INVENTION

Hereinafter, embodiments of the present invention are described in detail, but the present invention is not limited to them.
<Resin Composition for Optical Shaping>
The resin composition for optical shaping of the present invention is a composition to be used in an optical shaping method, and forms a photocured product by photocuring. Here, the optical shaping method includes methods by a liquid tank photopolymerization method (SLA, DLP, LCD), a material-jet method (MJM) and the like. In the present invention, the "resin composition for optical shaping" means a composition to be used in an optical shaping method, and the "photocured product" means a photocured product of a resin composition for optical shaping. In the present specification, the description on each configuration, characteristic, and the like regarding a resin composition for optical shaping is also applied to a model material composition to be used in a material-jet optical shaping method unless otherwise specified. Likewise, the description on each configuration, characteristic, and the like regarding a photocured product in the present specification is also applied to a model material that is a photocured product of a model material composition unless otherwise specified.

The resin composition for optical shaping of the present invention comprises a polymerizable compound, and the polymerizable compound comprises at least one polyfunctional ethylenically unsaturated monomer (B) having a ring structure other than an isocyanurate ring structure (hereinafter, also referred to as "monomer B") and at least one polyfunctional ethylenically unsaturated monomer (C) having an isocyanurate ring structure (hereinafter, also referred to as "monomer C"). In the present invention, the ethylenically unsaturated monomers is a polymerizable monomer having, in the molecule thereof, at least one ethylenic double bond having a property of being cured by energy rays. The monofunctional ethylenically unsaturated monomer is a polymerizable monomer having one ethylenic double bond in the molecule and the polyfunctional ethylenically unsaturated monomer is a polymerizable monomer having two or more ethylenic double bonds in the molecule.
[Polyfunctional Ethylenically Unsaturated Monomer (B) Having Ring Structure Other than Isocyanurate Ring Structure (Monomer B)]
When the resin composition for optical shaping of the present invention contains the monomer B, it is likely to suppress an excessive increase in viscosity of the resin composition for optical shaping and to enhance the dimensional stability of a resulting photocured product. In particular, by containing the monomer B in combination with the monomer C described later, thermal expansion of a resulting photocured product in a high temperature environment is suppressed, and dimensional stability is likely to be improved.

Examples of the monomer B include polyfunctional ethylenically unsaturated monomers having an alicyclic structure or an aromatic hydrocarbon ring structure. These monomers may be used each alone or two or more thereof may be used in combination. In the present specification, the alicyclic structure refers to an aliphatic cyclic structure in which carbon atoms are cyclically bonded.

Examples of the polyfunctional ethylenically unsaturated monomer having an alicyclic structure include polyfunctional (meth)acrylates having an alicyclic structure. Examples of the polyfunctional (meth)acrylates having an alicyclic structure include di or tri(meth)acrylates having an alicyclic structure, and specifically include cyclohexanedimethanol di(meth)acrylate, tricyclodecanedimethanol di(meth)acrylate and the like. In the present specification, "(meth)acrylate" represents both or either of acrylate and methacrylate.

Examples of the polyfunctional ethylenically unsaturated monomer having an aromatic hydrocarbon ring structure include bisphenol A ethylene oxide adduct di(meth)acrylate, bisphenol A propylene oxide adduct di(meth)acrylate and the like.

Among these polyfunctional ethylenically unsaturated monomers, polyfunctional ethylenically unsaturated monomers having an alicyclic structure are preferable from the viewpoint of dimensional stability. Preferable polyfunctional ethylenically unsaturated monomers having an alicyclic structure are di or tri(meth)acrylates having an alicyclic structure, more preferably di(meth)acrylates or tri(meth) acrylates having an alicyclic structure having 5 to 30 carbon atoms, even more preferably di or tri(meth)acrylates having an alicyclic structure having 6 to 20 carbon atoms, and particularly preferably di or tri(meth)acrylates having an alicyclic structure having 8 to 15 carbon atoms. When the monomer B is a polyfunctional ethylenically unsaturated monomer having an alicyclic structure, it is likely to obtain a resin composition for optical shaping capable of forming a photocured product that is hardly thermally expanded and has high dimensional stability even in a high temperature environment. In addition, it is easier to suppress an excessive increase in the viscosity of the resin composition for optical shaping than when the monomer B is a polyfunctional ethylenically unsaturated monomer having an aromatic hydrocarbon ring.

The linear expansion coefficient of a homopolymer of the monomer B is preferably 200 ppm or less. The linear expansion coefficient is more preferably 150 ppm or less, even more preferably 130 ppm or less, particularly preferably 120 ppm or less, and specially preferably 100 ppm or less. Since the effect of suppressing thermal expansion tends to increase as the linear expansion coefficient decreases, the lower limit value is not particularly limited and may be 0 ppm. When the linear expansion coefficient is equal to or less than the above-mentioned upper limit value, thermal expansion of a photocured product obtained from the resin composition for optical shaping, in a high temperature environment is suppressed, and the dimensional stability of the photocured product is likely to be improved. The linear expansion coefficient can be measured using a homopolymer of the monomer B as a test piece in a temperature range equal to or lower than a glass transition temperature, for example, in a range of from room temperature to (the glass transition temperature of the homopolymer 30° C.) in accordance with JIS K 7197. Specifically, it can be measured, for example, by the method described in Examples, and for example, the homopolymer of the monomer B is obtained by adding a photopolymerization initiator to the monomer B and then irradiating the monomer B with ultraviolet rays having an integrated light quantity of 500 mJ/cm$^2$ by a metal halide lamp to cure the monomer B.

The content of the monomer B is preferably 5 to 65 parts by mass based on 100 parts by mass of the resin composition for optical shaping. When the content of the monomer B is equal to or more than the above-mentioned lower limit value, the dimensional stability of a resulting photocured product is likely enhanced, and when the content is the above-mentioned upper limit value or less, the viscosity of the resin composition for optical shaping is easily adjusted to a viscosity suitable for an optical shaping method by suppressing an excessive increase in the viscosity. From the viewpoint of dimensional stability, the content of the monomer B is preferably 10 parts by mass or more, more preferably 15 parts by mass or more, and even more preferably 20 parts by mass or more, based on 100 parts by mass of the resin composition for optical shaping. From the viewpoint of the viscosity of the resin composition for optical shaping, the content is preferably 60 parts by mass or less, more preferably 50 parts by mass or less, and even more preferably 45 parts by mass or less.

In one embodiment of the present invention, when the resin composition for optical shaping is a model material composition to be used in a material-jet optical shaping method, the content of the monomer B suitable for the material-jet optical shaping method is 5 to 50 parts by mass based on 100 parts by mass of the model material composition. When the content of the monomer B is less than the above-mentioned lower limit value, it is difficult to impart sufficiently high dimensional stability to a resulting model material, and when the content of the monomer B exceeds the above-mentioned upper limit value, the viscosity of the model material composition tends to excessively increase. From the viewpoint of dimensional stability, the content of the monomer B is preferably 10 parts by mass or more, more preferably 15 parts by mass or more, and even more preferably 20 parts by mass or more, based on 100 parts by mass of the model material composition. From the viewpoint of the viscosity of the model material composition, the content is preferably 45 parts by mass or less, more preferably 35 parts by mass or less, and even more preferably 30 parts by mass or less.

[Polyfunctional Ethylenically Unsaturated Monomer (C) Having Isocyanurate Ring Structure (Monomer C)]

By containing the monomer C, the dimensional stability of a resulting photocured product in a high temperature environment can be improved. This is considered to be because by containing a polyfunctional monomer having a rigid structure, namely an isocyanurate ring structure, vibration of molecules in a photocured product obtained from the resin composition for optical shaping can be suppressed. Such an effect of improving the dimensional stability of a photocured product can be more effectively enhanced by combining the monomer C with the monomer B.

The monomer C is not particularly limited as long as it is a polyfunctional ethylenically unsaturated monomer having an isocyanurate ring structure, and examples thereof include polyfunctional (meth)acrylates having an isocyanurate ring structure, allyl compounds having an isocyanurate ring structure and the like. These monomers may be used each alone or two or more thereof may be used in combination. Examples of the polyfunctional (meth)acrylates having an isocyanurate ring structure include isocyanurate ethylene oxide-modified di or triacrylates, ethoxylated isocyanurate triacrylate, tris(2-hydroxyethyl) isocyanurate triacrylate, bis (2-hydroxyethyl) isocyanurate diacrylate and the like. Examples of the allyl compounds having an isocyanurate ring structure include triallyl isocyanurate, diallyl isocyanurate and the like.

Among these polyfunctional monomers, from the viewpoint of dimensional stability, polyfunctional (meth)acrylates having an isocyanurate ring structure are preferable, tri(meth)acrylates having an isocyanurate ring structure are more preferable, and tris(2-hydroxyethyl)isocyanurate triacrylate is particularly preferable.

The linear expansion coefficient of a homopolymer of the monomer C is preferably 200 ppm or less. The linear expansion coefficient is more preferably 150 ppm or less, even more preferably 120 ppm or less, particularly preferably 100 ppm or less, and specially preferably 80 ppm or less. Since the effect of suppressing thermal expansion tends to increase as the linear expansion coefficient decreases, the lower limit value is not particularly limited and may be 0 ppm. When the linear expansion coefficient is equal to or less than the above-mentioned upper limit value, thermal expansion of a photocured product obtained from the resin composition for optical shaping is likely suppressed, and dimensional stability of the photocured product in a high temperature environment is likely improved. The linear expansion coefficient can be measured using a homopolymer of the monomer C as a test piece in a temperature range equal to or lower than a glass transition temperature, for example, in a range of from room temperature to (the glass transition temperature of the homopolymer—30° C.) in accordance with JIS K 7197. Specifically, it can be measured, for example, by the method described in Examples, and for example, the homopolymer of the monomer C is obtained by adding a photopolymerization initiator to the monomer C and then irradiating the monomer C with ultraviolet rays having an integrated light quantity of 500 mJ/cm$^2$ by a metal halide lamp to cure the monomer C.

The content of the monomer C is 5 to 80 parts by mass based on 100 parts by mass of the resin composition for optical shaping. When the content of the monomer C is less than the above-mentioned lower limit value, it is difficult to impart sufficiently high dimensional stability to a resulting photocured product, and when the content of the monomer C exceeds the above-mentioned upper limit value, the viscosity of the resin composition for optical shaping tends to excessively increase. From the viewpoint of dimensional stability, the content of the monomer C is preferably 10 parts by mass or more, more preferably 15 parts by mass or more, and even more preferably 20 parts by mass or more, based on 100 parts by mass of the resin composition for optical shaping. From the viewpoint of the viscosity of the resin composition for optical shaping, the content is preferably 75 parts by mass or less, more preferably 70 parts by mass or less, and even more preferably 60 parts by mass or less.

In one embodiment of the present invention, when the resin composition for optical shaping is a model material composition to be used in a material-jet optical shaping method, the content of the monomer C suitable for the material-jet optical shaping method is 5 to 50 parts by mass based on 100 parts by mass of the model material composition. When the content of the monomer C is less than the above-mentioned lower limit value, it is difficult to impart sufficiently high dimensional stability to a resulting model material, and when the content of the monomer C exceeds the above-mentioned upper limit value, the model material composition tends to have an excessively increased viscosity and is difficult to be applied to a material-jet optical shaping method. From the viewpoint of dimensional stability, the content of the monomer C is preferably 10 parts by mass or more, more preferably 15 parts by mass or more, and even more preferably 20 parts by mass or more, based on 100 parts by mass of the model material composition. From the viewpoint of the viscosity of the model material composition, the content is preferably 40 parts by mass or less, more preferably 35 parts by mass or less, and even more preferably 30 parts by mass or less.

In the resin composition for optical shaping of the present invention, a ratio of the total mass of the monomer B to the total mass of the monomer C, monomer B monomer C (mass ratio) is preferably 1:20 to 10:1, more preferably 1:10 to 5:1, even more preferably 1:5 to 2:1, and particularly preferably 1:1.2 to 1.2:1. When the mass ratio of the monomer B to the monomer C is within the above-mentioned range, superior dimensional stability is likely imparted to a resulting photocured product. When the resin composition for optical shaping contains the monomer B and the monomer C at about the same mass proportion, vibration of molecules in a resulting photocured product is more likely suppressed, and dimensional stability is more likely improved.

In one embodiment of the present invention, when the resin composition for optical shaping is a model material composition to be used in a material-jet optical shaping method, the ratio of the total mass of monomers B to the total mass of monomers C suitable for the material-jet optical shaping method, monomer B:monomer C (mass ratio) is preferably 1:10 to 10:1, more preferably 1:5 to 5:1, even more preferably 1:2 to 2:1, and particularly preferably 1:1.2 to 1.2:1. When the mass ratio of the monomer B to the monomer C is within the above-mentioned range, superior dimensional stability is likely imparted to a resulting model material. When the model material composition contains the monomer B and the monomer C at about the same mass proportion, the vibration of molecules in a resulting model material is more likely suppressed, and the dimensional stability is more likely improved.

[Monofunctional Ethylenically Unsaturated Monomer (A) (Monomer A)]

The resin composition for optical shaping of the present invention preferably comprises a monofunctional ethylenically unsaturated monomer (A) (hereinafter, also referred to as "monomer A") in addition to the monomer B and the monomer C from the viewpoint of easily adjusting the viscosity to an appropriate viscosity according to the optical shaping method to be employed. When the resin composition for optical shaping of the present invention contains the monomer A, it is easy to adjust the viscosity to a viscosity suitable for a material-jet optical shaping method. In the present invention, examples of the monofunctional ethylenically unsaturated monomer (A) include alkyl (meth) acrylates having a linear or branched alkyl group; (meth) acrylates having a ring structure such as an alicyclic structure, an aromatic ring structure, or a heterocyclic structure in the molecule; and monofunctional ethylenically unsaturated monomers containing a nitrogen atom, such as (meth)acrylamide and N-vinyllactams. These monomers may be used each alone or two or more thereof may be used in combination. In the present specification, "(meth)acrylamide" represents both or either of acrylamide and methacrylamide. In the present specification, the aromatic ring structure refers to an aromatic cyclic structure in which carbon atoms are cyclically bonded, and the heterocyclic structure refers to a structure in which carbon atoms and one or more heteroatoms are cyclically bonded.

Examples of the alkyl (meth)acrylate having a linear or branched alkyl group include alkyl (meth)acrylates having a linear or branched alkyl group preferably having 4 to 30 carbon atoms, and more preferably having 6 to 20 carbon atoms. Specifically, examples thereof include methyl (meth) acrylate, ethyl (meth)acrylate, isobutyl (meth)acrylate, amyl (meth)acrylate, isoamyl (meth)acrylate, octyl (meth)acrylate, isooctyl (meth)acrylate, decyl (meth)acrylate, isodecyl (meth)acrylate, lauryl (meth)acrylate, isomyristyl (meth) acrylate, stearyl (meth)acrylate, isostearyl (meth)acrylate, 2-ethylhexyl-diglycol (meth)acrylate, stearyl (meth)acrylate, isostearyl (meth)acrylate, t-butyl (meth)acrylate, 6-carboxyethyl (meth)acrylate, 2-hydroxyethyl (meth)acrylate, 2-hydroxypropyl (meth)acrylate, 2-hydroxybutyl (meth) acrylate, 2-(2-ethoxyethoxy)ethyl (meth)acrylate, butoxyethyl (meth)acrylate, ethoxy-diethylene glycol (meth)acrylate, methoxy-triethylene glycol (meth)acrylate, methoxy-polyethylene glycol (meth)acrylate, methoxydipropylene glycol (meth)acrylate, caprolactone (meth)acrylate, 2-(meth)acryloyloxyethyl-succinic acid and the like.

Examples of the (meth)acrylate having an alicyclic structure include (meth)acrylates having an alicyclic structure preferably having 6 to 20 carbon atoms, and more preferably having 8 to 15 carbon atoms. Specifically, examples thereof include cyclohexyl (meth)acrylate, 4-t-butylcyclohexyl (meth)acrylate, isobornyl (meth)acrylate, dicyclopentanyl (meth)acrylate, adamantyl (meth)acrylate, 3,3,5-trimethyl-cyclohexanol (meth)acrylate and the like.

Examples of the (meth)acrylate having an aromatic ring structure include (meth)acrylates having an aromatic ring structure preferably having 6 to 20 carbon atoms, and more preferably having 8 to 15 carbon atoms. Specifically, examples thereof include phenoxyethyl (meth)acrylate, phenoxy-polyethylene glycol (meth)acrylate, 2-hydroxy-3-phenoxypropyl (meth)acrylate, nonylphenol ethylene oxide adduct (meth)acrylate, 2-(meth)acryloyloxyethyl-phthalic acid, neopentyl glycol-acrylic acid-benzoic acid ester, 2-(meth)acryloyloxyethylhexahydrophthalic acid, benzyl acrylate, phenylphenol acrylate, fluorene acrylate and the like.

Examples of the (meth)acrylate having a heterocyclic structure include (meth)acrylates having a heterocyclic structure preferably having 5 to 20 carbon atoms, and more preferably having 7 to 15 carbon atoms. Specifically, examples thereof include tetrahydrofurfuryl (meth)acrylate, cyclic trimethylolpropane formal (meth)acrylate, 4-(meth)acryloyloxymethyl-2-methyl-2-ethyl-1,3-dioxolane, 4-(meth)acryloyloxymethyl-2-cyclohexyl-1,3-dioxolane and the like.

Examples of the monofunctional ethylenically unsaturated monomer containing a nitrogen atom, which is different from the above (meth)acrylate, include (meth)acrylamides [e.g., N,N-dimethylacrylamide, N,N-diethylacrylamide, N-isopropylacrylamide, hydroxyethylacrylamide, hydroxypropylacrylamide, N,N-acryloylmorpholine and the like], N-vinyllactams [e.g., N-vinylpyrrolidone, N-vinylcaprolactam and the like], N-vinylformamide and the like.

Among these monofunctional monomers, the monomer A is preferably a monofunctional ethylenically unsaturated monomer having a ring structure in the molecule. When the monomer A is a monofunctional ethylenically unsaturated monomer having a ring structure in the molecule, a photocured product having high dimensional stability is likely obtained. This is presumed to be because the vibration of molecules in a photoproduct obtained from the resin composition for optical shaping is likely suppressed as compared with the monomer A having no ring structure. In the resin composition for optical shaping of the present invention, the content of the monofunctional ethylenically unsaturated monomer having a ring structure in the molecule is preferably 50% by mass or more, and more preferably 80% by mass or more, based on the total mass of the monofunctional ethylenically unsaturated monomer (A), and all the monofunctional ethylenically unsaturated monomers (A) contained in the resin composition for optical shaping may have a ring structure in the molecule.

From the viewpoint of heat resistance, a homopolymer of the monomer A preferably has a glass transition temperature Tg of 80° C. or higher, more preferably 100° C. or higher, and even more preferably 120° C. or higher. The glass transition temperature Tg of the monomer A is preferably 200° C. or lower, more preferably 180° C. or lower, and even more preferably 160° C. or lower from the viewpoint of cure shrinkage that occurs when the resin composition for optical shaping is cured. The glass transition temperature is measured by a differential scanning calorimeter (DSC) using a homopolymer of the monomer A as a test piece. Specifically, for example, it is measured by the method described in Examples.

The content of the monomer A is less than 70 parts by mass based on 100 parts by mass of the resin composition for optical shaping. When the content of the monomer A is equal to or less than the above-mentioned upper limit value, the dimensional stability of a resulting photocured product is likely improved. The lower limit value of the content of the monomer A is not particularly limited, but it is preferably 5 parts by mass or more, more preferably 10 parts by mass or more, and even more preferably 19 parts by mass or more based on 100 parts by mass of the resin composition for optical shaping from the viewpoint of imparting a viscosity suitable for a optical shaping method to the resin composition for optical shaping. From the viewpoint of dimensional stability, the content is preferably 65 parts by mass or less, more preferably 59 parts by mass or less, even more preferably 55 parts by mass or less, even more preferably 53 parts by mass or less, and particularly preferably 48 parts by mass or less.

In one embodiment of the present invention, when the resin composition for optical shaping is a model material composition to be used in a material-jet optical shaping method, the model material composition contains the monomer A in addition to the monomer B and the monomer C. The content of the monomer A suitable for a material-jet optical shaping method is 19 to 59 parts by mass based on 100 parts by mass of the model material composition. When the content of the monomer A is less than the lower limit value, it is difficult to adjust the viscosity of the model material composition to a moderate range, and when the content of the monomer A exceeds the upper limit value, it is difficult to impart sufficiently high dimensional stability to a resulting model material. The content of the monomer A is preferably 25 parts by mass or more, more preferably 30 parts by mass or more, and even more preferably 35 parts by mass or more based on 100 parts by mass of the model material composition from the viewpoint of imparting a viscosity suitable for a material-jet optical shaping method to the model material composition. From the viewpoint of dimensional stability, the content is preferably 55 parts by mass or less, more preferably 53 parts by mass or less, and even more preferably 48 parts by mass or less.

When the resin composition for optical shaping of the present invention contains the monomer A, in the resin composition for optical shaping, a ratio of the total mass of the monomers A to the total mass of the monomers B, monomer A:monomer B (mass ratio) is preferably 10:1 to 1:8, more preferably 5:1 to 1:4, and even more preferably 2:1 to 1:2. When the mass ratio of the monomer A to the monomer B is within the above-mentioned range, it is likely to achieve both a moderate viscosity of the resin composition for optical shaping and high dimensional stability of a photocured product to be obtained in a high temperature environment.

In one embodiment of the present invention, when the resin composition for optical shaping is a model material composition to be used in a material-jet optical shaping method, a ratio of the total mass of the monomer A to the total mass of the monomer B, monomer A:monomer B (mass ratio), which is suitable for the material-jet optical shaping method, is preferably 10:1 to 1:3, more preferably 5:1 to 1:2, and even more preferably 2:1 to 1:1. When the mass ratio of the monomer A to the monomer B is within the above-mentioned range, it is likely to achieve both a moderate viscosity of the model material composition and high dimensional stability of a resulting model material in a high temperature environment.

When the resin composition for optical shaping of the present invention contains the monomer A, in the resin composition for optical shaping, a ratio of the total mass of the monomers A to the total mass of the monomers C, monomer A:monomer C (mass ratio) is preferably 10:1 to 1:10, more preferably 5:1 to 1:5, and even more preferably 2:1 to 1:2. When the mass ratio of the monomer A to the monomer C is within the above-mentioned range, it is likely to achieve both a moderate viscosity of the resin composition for optical shaping and high dimensional stability of a resulting photocured product in a high temperature environment.

In one embodiment of the present invention, when the resin composition for optical shaping is a model material composition to be used in a material-jet optical shaping method, a ratio of the total mass of the monomer A to the total mass of the monomer C, monomer A:monomer C (mass ratio), which is suitable for the material-jet optical shaping method, is preferably 10:1 to 1:3, more preferably 5:1 to 1:2, and even more preferably 2:1 to 1:1. When the mass ratio of the monomer A to the monomer C is within the above-mentioned range, it is likely to achieve both a moderate viscosity of the model material composition and high dimensional stability of a resulting model material in a high temperature environment.

Because the resin composition for optical shaping of the present invention contains both the monomer B and the monomer C, thermal expansion of a resulting photocured product is suppressed, and dimensional stability in a high temperature environment is likely sufficiently improved. When the resin composition for optical shaping of the present invention contains the monomer A, in the resin composition for optical shaping, the ratio of the total mass of the monomer B and the monomer C to the total mass of the monomer A:(monomer B+monomer C)/monomer A (mass ratio) is preferably 0.5 to 10, more preferably 0.5 to 5, even more preferably 0.8 to 4, further preferably 0.8 to 3, particularly preferably 1 to 2, and specially preferably 1 to 1.5. When the ratio of the total mass of the monomer B and the monomer C to the total mass of the monomer A is within the above-mentioned range, it is likely to achieve both a moderate viscosity of the resin composition for optical shaping and high dimensional stability of a resulting photocured product in a high temperature environment. In the resin composition for optical shaping of the present invention, the total content of the monomer B and the monomer C is preferably 30% by mass or more, more preferably 35% by mass or more, and even more preferably 40% by mass or more based on the total amount of all polymerizable compounds in the resin composition for optical shaping from the viewpoint of dimensional stability. In addition, from the viewpoint of the viscosity of the resin composition for optical shaping, the total content is preferably 95% by mass or less, more preferably 80% by mass or less, even more preferably 70% by mass or less, and particularly preferably 60% by mass or less. In the present specification, the "polymerizable compound" represents a compound having a polymerizable group such as a polymerizable monomer or a polymerizable oligomer.

In the resin composition for optical shaping of the present invention, the total content of the monomer B and the monomer C is preferably more than 30 parts by mass, more preferably 35 parts by mass or more, and even more preferably 40 parts by mass or more based on 100 parts by mass of the resin composition for optical shaping from the viewpoint of dimensional stability. From the viewpoint of the viscosity of the resin composition for optical shaping, the total content is preferably 95 parts by mass or less, more preferably 80 parts by mass or less, even more preferably 70 parts by mass or less, and particularly preferably 60 parts by mass or less.

[Other Polymerizable Compounds]

The resin composition for optical shaping of the present invention may contain polymerizable compounds other than the monomer B, the monomer C, and the monomer A optionally contained. Examples of the other polymerizable compounds include a polyfunctional polymerizable monomer having no ring structure and a polymerizable oligomer. In the present specification, the "polymerizable oligomer" refers to a photocurable component having a property of being cured by energy rays and having a weight average molecular weight Mw of 1,000 to 10,000. The weight average molecular weight Mw is measured in terms of a standard polystyrene using GPC (Gel Permeation Chromatography).

Examples of the polyfunctional polymerizable monomer having no ring structure include epoxy poly(meth)acrylate, polyester poly(meth)acrylate, and poly(meth)acrylates having a urethane group, as a polyfunctional ethylenically unsaturated monomer having no ring structure in the molecule. These polyfunctional polymerizable monomers may be used each alone or two or more thereof may be used in combination.

Examples of the polymerizable oligomer include an epoxy (meth)acrylate oligomer, a polyester (meth)acrylate oligomer, a urethane (meth)acrylate oligomer and the like. These polymerizable oligomers may be used each alone or two or more thereof may be used in combination. By containing the polymerizable oligomer, flexibility is likely imparted to a photocured product obtained from the resin composition for optical shaping. The polymerizable oligomer is preferably a polymerizable oligomer having a urethane group, and more preferably a urethane (meth)acrylate oligomer.

When the resin composition for optical shaping contains other polymerizable compound, the content thereof is not limited as long as the effect of the present invention is not impaired, and is, for example, preferably 0.1 to 30 parts by mass, more preferably 0.5 to 15 parts by mass, and even more preferably 1 to 10 parts by mass based on 100 parts by mass of the resin composition for optical shaping.

The total amount of the polymerizable compounds contained in the resin composition for optical shaping is preferably 10 to 99 parts by mass, more preferably 29 to 99 parts by mass, even more preferably 50 to 98 parts by mass, and particularly preferably 80 to 95 parts by mass based on 100 parts by mass of the resin composition for optical shaping.

[Other Additives]

The resin composition for optical shaping of the present invention may contain other additives, as necessary, as long as the effect of the present invention is not impaired. Examples of such other additives include photopolymerization initiators, surface adjusting agents, coloring agents, preservation stabilizers, antioxidants, ultraviolet absorbers, light stabilizers, polymerization inhibitors, chain transfer agents, fillers, dilution solvents, thickeners and the like.

(Photopolymerization Initiator (D))

The photopolymerization initiator is not particularly limited as long as it is a compound that promotes a radical reaction when being irradiated with ultraviolet rays, near ultraviolet rays or light having a wavelength in the visible light region. Examples of the photopolymerization initiator include benzoin compounds having 14 to 18 carbon atoms [e.g., benzoin, benzoin methyl ether, benzoin ethyl ether, benzoin propyl ether, and benzoin isobutyl ether], acetophenone compounds having 8 to 18 carbon atoms [e.g., acetophenone, 2,2-diethoxy-2-phenylacetophenone, 2,2-diethoxy-2-phenylacetophenone, 1,1-dichloroacetophenone, 2-hydroxy-2-methyl-phenylpropan-1-one, diethoxy acetophenone, and 1-hydroxycyclohexyl phenyl ketone], anthraquinone compounds having 14 to 19 carbon atoms [e.g., 2-ethylanthraquinone, 2-t-butylanthraquinone, 2-chloroanthraquinone, and 2-amylanthraquinone], thioxanthone compounds having 13 to 17 carbon atoms [e.g., 2,4-diethylthioxanthone, 2-isopropylthioxanthone, and 2-chlorothioxanthone], ketal compounds having 16 to 17 carbon atoms [e.g., acetophenonedimethylketal and benzyldimethylketal], benzophenone compounds having 13 to 21 carbon atoms [e.g., benzophenone, 4-benzoyl-4'-methyldiphenyl sulfide, and 4,4'-bismethylaminobenzophenone], acylphosphine oxide compounds having 22 to 28 carbon atoms [e.g., 2,4,6-trimethylbenzoyl-diphenyl-phosphine oxide, bis-(2,6-dimethoxybenzoyl)-2,4,4-trimethylpentylphosphine oxide, and bis(2,4,6-trimethylbenzoyl)-phenylphosphine oxide], α-aminoalkylphenone compounds [e.g., 2-methyl-1-[4-(methylthio)phenyl]-2-morpholinopropan-1-one, 2-benzyl-2-dimethylamino-1-(4-morpholinophenyl)butanone-1, 2-methyl-1-[4-(methoxythio)-phenyl]-2-morpholinopropan-2-one, and 2-dimethylamino-2-(4-methyl-benzyl)-1-(4-morpholin-4-yl-phenyl)-butan-1-one], and mixtures of these compounds. These may be used alone or two or more thereof may be used in combination. Among these, 2,4,6-trimethylbenzoyl-diphenyl-phosphine oxide is preferable in that a photocured product obtained by photocuring the resin composition for optical shaping and an optically shaped article are hard to be yellowed and that the resulting photocured product and stereolithographic article have high light resistance etc. and are hard to be yellowed with time. Additionally, examples of an available acylphosphine oxide compound include DAROCURE TPO manufactured by BASF SE.

When the resin composition for optical shaping contains a photopolymerization initiator, the content thereof is preferably 1 to 15 parts by mass, more preferably 3 parts by mass or more, and more preferably 12 parts by mass or less based on 100 parts by mass of the resin composition for optical shaping. When the content of the photopolymerization initiator is equal to or more than the above-mentioned lower limit value, the amount of unreacted polymerizable components is sufficiently reduced and the curability of the photocured product is likely enhanced. On the other hand, when the content of the photopolymerization initiator is equal to or less than the above upper limit value, the amount of the photopolymerization initiator remaining unreacted in the photocured product is likely reduced, and yellowing of the photocured product caused by remaining of the unreacted photopolymerization initiator is likely suppressed.

(Surface Adjusting Agent (E))

The surface adjusting agent is a component that adjusts the surface tension of the resin composition for optical shaping to an appropriate range, and the type thereof is not particularly limited. When the surface tension of the resin composition for optical shaping is set within an appropriate range, in the case of using the resin composition for optical shaping in a material-jet optical shaping method, the dischargeability can be stabilized and the interface mixing between the model material composition and the support material composition can be suppressed. As a result, it is easy to obtain an optically shaped article having good dimensional accuracy.

Examples of the surface adjusting agent include silicone-based compounds. Examples of the silicone-based compounds include silicone-based compounds having a polydimethylsiloxane structure. Specifically, the examples include polyether-modified polydimethylsiloxane, polyester-modified polydimethylsiloxane, and polyaralkyl-modified polydimethylsiloxane. As these, BYK-300, BYK-302, BYK-306, BYK-307, BYK-310, BYK-315, BYK-320, BYK-322, BYK-323, BYK-325, BYK-330, BYK-331, BYK-333, BYK-337, BYK-344, BYK-370, BYK-375, BYK-377, BYK-UV3500, BYK-UV3510, BYK-UV3570 (manufactured by BYK-Chemie GmbH), TEGO-Rad 2100, TEGO-Rad 2200N, TEGO-Rad 2250, TEGO-Rad 2300, TEGO-Rad 2500, TEGO-Rad 2600, TEGO-Rad 2700 (manufactured by EVONIK JAPAN CO., LTD.), Granol 100, Granol 115, Granol 400, Granol 410, Grand 435, Granol 440, Granol 450, B-1484, POLYFLOW ATF-2, KL-600, UCR-L72, UCR-L93 (manufactured by KYOEISHA CHEMICALS Co., LTD.) and the like under the trade names may be used. In addition, a surface adjusting agent other than the silicone-based compound (for example, a fluorine-based surface adjusting agent) may be used. These may be used alone or two or more thereof may be used in combination.

When the resin composition for optical shaping contains a surface adjusting agent, the content thereof is preferably 0.005 to 3 parts by mass, more preferably 0.01 parts by mass or more, and more preferably 1.5 parts by mass or less, based on 100 parts by mass of the resin composition for optical shaping. When the content of the surface adjusting agent is within the above-mentioned range, it is easy to adjust the surface tension of the resin composition for optical shaping.

(Preservation Stabilizer (F))

The preservation stabilizer is a component that can enhance the preservation stability of a resin composition for optical shaping. When the resin composition for optical shaping is a model material composition to be used in a material-jet optical shaping method, head clogging which is caused by polymerization of a polymerizable compound with heat energy can be prevented.

Examples of the preservation stabilizer include hindered amine-based compounds (HALS), phenol-based antioxidants, and phosphorus-based antioxidants. Examples of the preservation stabilizer include hydroquinone, methoquinone, benzoquinone, p-methoxyphenol, hydroquinone monomethyl ether, hydroquinone monobutyl ether, TEMPO, 4-hydroxy-TEMPO, TEMPOL, H-TEMPO (4-hydroxy-2,2,6,6-tetramethylpiperidine-N-oxyl), Cupferron AI, IRGASTAB UV-10, IRGASTAB UV-22 and FIRSTCURE ST-1 manufactured by ALBEMARLE Corporation, t-butyl-catechol, pyrogallol, TINUVIN 111 FDL, TINUVIN 144, TINUVIN 292, TINUVIN XP40, TINUVIN XP60, and TINUVIN 400 manufactured by BASF SE. These may be used alone or two or more thereof may be used in combination.

When the resin composition for optical shaping contains a preservation stabilizer, the content thereof is preferably 0.05 to 3 parts by mass, more preferably 0.08 parts by mass or more, and more preferably 2 parts by mass or less based on 100 parts by mass of the resin composition for optical shaping from the viewpoint of easily obtaining the effect described above.

[Coloring Agent]

The resin composition for optical shaping of the present invention may further comprise a coloring agent. The coloring agent is not particularly limited, but since the resin composition for optical shaping of the present invention is nonaqueous, a pigment that is likely to be uniformly dispersed in a water-insoluble medium and a dye that is likely to be dissolved in a water-insoluble medium are preferable.

As the pigment, either an inorganic pigment or an organic pigment can be used. Examples of the inorganic pigment include titanium oxide, zinc white, zinc oxide, lithopone, iron oxide, aluminum oxide, silicon dioxide, kaolinite, montmorillonite, talc, barium sulfate, calcium carbonate, silica, alumina, cadmium red, red iron oxide, molybdenum red, chrome vermilion, molybdate orange, lead yellow, chrome yellow, cadmium yellow, yellow iron oxide, titanium yellow, chromium oxide, pyridiane, cobalt green, titanium cobalt green, cobalt chrome green, ultramarine, ultramarine blue, prussian blue, cobalt blue, cerulean blue, manganese violet, cobalt violet, and mica. Examples of the organic pigment include azo organic pigments, azomethine organic pigments, polyazo organic pigments, phthalocyanine organic pigments, quinacridone organic pigments, anthraquinone organic pigments, indigo organic pigments, thioindigo organic pigments, quinophthalone organic pigments, benzimidazolone organic pigments, and isoindoline organic pigments. Carbon black composed of acidic, neutral or basic carbon may be used. Furthermore, hollow particles of a crosslinked acrylic resin may also be used as the organic pigment.

In the resin composition for optical shaping of the present invention, pigments having a black color and three primary colors, namely, cyan, magenta and yellow are usually used, and pigments having other hues, metallic glossy pigments having a gold color, a silver color, or the like, and colorless or light colored extender pigments may also be used according to the purpose.

The coloring agents may be used each alone or two or more thereof may be used in combination. In the present invention, two or more organic pigments or solid solutions of organic pigments may be used in combination. Different coloring agents may be used for each droplet and liquid to be dropped, or the same coloring agent may be used.

For dispersing the coloring agent, for example, a dispersing device such as a bead mill, a ball mill, a sand mill, an attritor, a roll mill, a jet mill, a homogenizer, a paint shaker, a kneader, an agitator, a Henschel mixer, a colloid mill, an ultrasonic homogenizer, a pearl mill, or a wet jet mill can be used, and a mixing device such as a line mixer may be used. Further, after the dispersion of the coloring agent, classification treatment may be performed using a centrifuge, a filter, a crossflow, or the like for the purpose of removing coarse particles of the colorant.

When the coloring agent is dispersed, a dispersant may be added. The type of the dispersant is not particularly limited, but a publicly-known polymer dispersant is preferably used.

The content of the dispersant is appropriately chosen according to the purpose of use, but may be, for example, 0.01 to 5 parts by mass based on 100 parts by mass of the resin composition for optical shaping.

When the coloring agent is added, synergists according to various colorants may be used as a dispersion aid, as necessary.

The content of the coloring agent is appropriately chosen according to the color and the purpose of use, and is preferably 0.05 to 30 parts by mass, and more preferably 0.1 to 10 parts by mass based on 100 parts by mass of the resin composition for optical shaping from the viewpoint of image density and preservation stability.

The method for producing the resin composition for optical shaping of the present invention is not particularly limited. For example, the resin composition for optical shaping can be produced by uniformly mixing components for constituting the resin composition using a mixing and stirring device or the like.

[Characteristics of Resin Composition for Optical Shaping and Photocured Product Thereof]

The viscosity of the resin composition for optical shaping of the present invention may be any viscosity suitable for a optical shaping method to be employed, and may be, for example, 10 to 2500 mPa s, and preferably 20 to 1500 mPa·s at 25° C.

In one embodiment of the present invention, when the resin composition for optical shaping is a model material composition to be used in a material-jet optical shaping method, the viscosity of the model material composition of the present invention is preferably 20 mPa·s or more, more preferably 30 mPa·s or more, even more preferably 35 mPa·s or more, and is preferably 100 mPa·s or less, more preferably 90 mPa·s or less, even more preferably 85 mPa·s or less at 25° C. from the viewpoint of improving dischargeability from a material jetting nozzle. The viscosity can be measured using an 8100 type viscometer in accordance with JIS Z 8803.

The viscosity of the resin composition for optical shaping can be controlled by adjusting the type and blending ratio of an ethylenically unsaturated monomer, the type and addition amount of a dilution solvent and the thickener, etc.

The linear expansion coefficient of the photocured product of the present invention obtained by photocuring the resin composition for optical shaping of the present invention is preferably 150 ppm or less. The linear expansion coefficient is more preferably 130 ppm or less, even more preferably 120 μm or less, and particularly preferably less than 100 ppm. Since the effect of suppressing thermal expansion tends to increase as the linear expansion coefficient decreases, the lower limit value is not particularly limited and may be 0 ppm. When the linear expansion coefficient is equal to or less than the above-mentioned upper limit value, for example, thermal expansion of a photocured product is likely suppressed even under a high temperature environment exceeding 100° C. and high dimensional stability can be secured. The linear expansion coefficient can be measured in a temperature range equal to or lower than a glass transition temperature, for example, in a range of from room temperature to (the glass transition temperature of the homopolymer—30° C.), for example, in accordance with JIS K 7197. Specifically, for example, it is measured by the method described in the Examples using, as a test piece, a photocured product prepared by curing a resin composition for optical shaping by irradiating it with ultraviolet rays such that a total exposure is 500 mJ/cm$^2$. The total exposure is measured using, for example, UV METER UVPF-36 (manufactured by EYE GRAPHICS Co., Ltd.).

The photocured product of the present invention has a low linear expansion coefficient and exhibits a small dimensional change in a high temperature environment, and thus is suitable for applications in a high temperature environment. Examples of such applications include a housing of an electronic device and a member constituting an electronic device. In particular, the photocured product of the present invention is suitable for a member for a printed circuit board (for example, an insulating board for printed wiring) of an electronic device. In general, when a printed circuit board is manufactured, a member for a printed circuit board is subjected to a step of forming a metal wiring by linearly arranging a liquid metal on the member for a printed circuit board and then calcining the metal. Such a step is usually performed in a high temperature environment exceeding 100° C. When a member for a printed circuit board is made of a photocured product not having sufficient heat resistance, the member for a printed circuit board is likely to thermally expand in such a high temperature environment, and there is a possibility that a metal wire disposed on the member is cracked by applying a tensile stress to the metal wire. A printed circuit hoard member formed using the photocured product of the present invention is less likely to thermally expand even in such a high temperature environment and has high dimensional stability, so that defects such as cracking of the metal wire as described above are less likely to occur.

The member for a printed circuit board can be produced by shaping the resin composition for optical shaping of the present invention into a shape of a desired member for a printed circuit board by an optical shaping method, and then photocuring the resin composition. For example, the member for a printed circuit board can be produced by forming a optically shaped article (or a three-dimensionally shaped article) having a shape of a desired member for a printed circuit board by a material-jet optical shaping method using the model material composition of the present invention. The production of a optically shaped article may be performed, for example, by a method described later.

In a printed circuit board manufactured by wiring a metal wire or an electronic component directly or indirectly by a publicly-known method such as soldering on a member for a printed circuit board formed using the resin composition for optical shaping of the present invention, the member for a printed circuit board is less likely to thermally expand even in a high temperature environment and has high dimensional stability, so that defects such as cracking of the metal wire are less likely to occur than in a printed circuit board manufactured using a conventional resin composition for optical shaping.

<Composition Set for Material-Jet Optical Shaping>

In order to form a complicated shape or a minute shape with high accuracy, the model material composition of the present invention is preferably used in combination with a support material for supporting the model material during three-dimensional shaping. Accordingly, the present invention is also directed to a composition set for material-jet optical shaping comprising the model material composition of the present invention and a support material composition for shaping a support material by a material-jet optical shaping method used together with the model material composition.

[Support Material Composition]

The support material composition is a composition to be used in a material-jet optical shaping method and constitutes a support material by photocuring. After the model material is manufactured, the support material may be removed from the model material by physical peeling the support material from the model material or dissolving the support material in an organic solvent or water. The model material composition of the present invention can be used in combination with various compositions conventionally publicly-known as support material compositions, but the support material composition constituting the composition set for material-jet optical shaping of the present invention is preferably soluble in water because the model material is not damaged when the support material is removed, the support material is environmentally friendly, and the support material can be removed cleanly and easily even in a fine part.

(Polyalkylene Glycol Containing Oxybutylene Group)

Examples of the water-soluble support material composition include those comprising a polyalkylene glycol containing an oxybutylene group. The polyalkylene glycol containing an oxybutylene group is water-soluble, but does not have hydrophilicity as high as the support force of a support material is lowered when the support material is formed. However, since the polyalkylene glycol containing an oxybutylene group is water soluble, a support material is superior in removability by water when the support material is formed.

The polyalkylene glycol containing an oxybutylene group is a water-soluble resin for imparting appropriate hydrophilicity to a support material, and a support material having both removability by water and a support force can be obtained by adding the polyalkylene glycol.

The polyalkylene glycol containing an oxybutylene group is not particularly limited with respect to the structure of the alkylene portion thereof as long as the polyalkylene glycol contains an oxybutylene group. For example, the polyalkylene glycol may be a polybutylene glycol having only an oxybutylene group (oxytetramethylene group), or alternatively may be a polybutylene polyoxyalkylene glycol having both an oxybutylene group and another oxyalkylene group (e.g., polybutylene polyethylene glycol).

Polybutylene glycol is represented by the following chemical formula (1), and polybutylene polyethylene glycol is represented by the following chemical formula (2).

$$HO(CH_2CH_2CH_2CH_2O)_nH \tag{1}$$

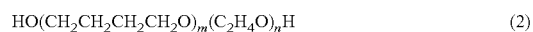

$$HO(CH_2CH_2CH_2CH_2O)_m(C_2H_4O)_nH \tag{2}$$

In the chemical formula (2), m is preferably an integer of 5 to 300, and n is preferably an integer of 2 to 150. More preferably, m is 6 to 200 and n is 3 to 100. The oxybutylene group in the chemical formula (1) and the chemical formula (2) may be linear or branched.

The content of the polyalkylene glycol containing an oxybutylene group is preferably 15 to 75 parts by mass, more preferably 17 to 72 parts by mass, and even more preferably 20 to 70 parts by mass based on 100 parts by mass of the support material composition. When the content is equal to or more than the above-mentioned lower limit value, the hydrophilicity of the support material is improved, so that the removability by water of the support material is likely improved. When the content is equal to or less than the upper limit value, softening of the support material is suppressed and self-standing property is likely maintained, so that the support force of the support material is likely improved.

The weight average molecular weight of the polyalkylene glycol containing an oxybutylene group is preferably 300 to 3,000, and more preferably 800 to 2,000. When the weight average molecular weight of the polyalkylene glycol containing an oxybutylene group is equal to or more than the lower limit value, bleeding of the support material when the support material composition is cured is likely suppressed. Bleeding is a phenomenon in which a liquid component oozes from the inside of the cured support material onto the surface of the support material. When the weight average molecular weight of the polyalkylene glycol containing an oxybutylene group is equal to or less than the above-mentioned upper limit value, the discharge stability of the support material composition is likely improved.

The polyalkylene glycol containing an oxybutylene group may be used singly or two or more thereof may be used in combination. When two or more polyalkylene glycols containing an oxybutylene group are used, the content of the polyalkylene glycol containing an oxybutylene group having a weight average molecular weight within the above-mentioned range is preferably 80% by mass or more, more preferably 90% by mass or more, even more preferably 95% by mass or more, and particularly preferably 100% by mass based on the total amount of the polyalkylene glycols containing an oxybutylene group.

(Water-Soluble Monofunctional Ethylenically Unsaturated Monomer)

The support material composition contained in the composition set for material-jet optical shaping of the present invention preferably comprises a water-soluble monofunctional ethylenically unsaturated monomer in addition to the polyalkylene glycol containing an oxybutylene group. The water-soluble monofunctional ethylenically unsaturated monomer is a component that is polymerized to form a constituent of the support material and exert a support force. While the water-soluble monofunctional ethylenically unsaturated monomer is water-soluble, it tends to impart hardness to the support material and improve the support ability.

Examples of the water-soluble monofunctional ethylenically unsaturated monomer include hydroxy group-containing (meth)acrylates having 5 to 15 carbon atoms (C) [hydroxyethyl (meth)acrylate, hydroxypropyl (meth)acrylate, 4-hydroxybutyl (meth)acrylate, etc.], alkylene oxide adduct-containing (meth)acrylates having a number average molecular weight (Mn) of 200 to 1000 [polyethylene glycol mono(meth)acrylate, monoalkoxy(C1 to 4) polyethylene glycol mono(meth)acrylate, polypropylene glycol mono (meth)acrylate, monoalkoxy(C1 to 4) polypropylene glycol mono(meth)acrylate, and mono(meth)acrylate of PEG-PPG block polymer, etc.], C3 to 15 (meth)acrylamide derivatives [(meth)acrylamide, N-methyl(meth) acrylamide, N-ethyl (meth)acrylamide, N-propyl(meth)acrylamide, N-butyl (meth)acrylamide, N,N'-dimethyl(meth)acrylamide, N, N'-diethyl(meth)acrylamide, N-hydroxyethyl(meth)acrylamide, N-hydroxypropyl(meth)acrylamide, N-hydroxybutyl (meth)acrylamide, etc.], (meth)acryloylmorpholine and the like. These water-soluble monofunctional ethylenically unsaturated monomers may be used each alone or two or more thereof may be used in combination.

The content of the water-soluble monofunctional ethylenically unsaturated monomer is preferably 15 to 80 parts by mass, more preferably 22 to 76 parts by mass, and even more preferably 25 to 73 parts by mass based on 100 parts by mass of the support material composition. When the content is equal to or more than the above-mentioned lower limit value, the support force of the support material is likely improved, and when the content is equal to or less than the above-mentioned upper limit value, the removability by water of the support material is likely improved.

(Photopolymerization Initiator)

The support material composition contained in the composition set for material-jet optical shaping of the present invention may further comprise a photopolymerization initiator.

The photopolymerization initiator contained in the support material composition is not particularly limited, and examples thereof include the same photopolymerization initiators as those of the model material composition described above, and preferred photopolymerization initiators are also the same as those of the model material composition.

The content of the photopolymerization initiator is preferably 1 to 20 parts by mass based on 100 parts by mass of the support material composition. When the content of the photopolymerization initiator is within the above-mentioned range, unreacted polymerizable components are sufficiently reduced and the curability of the support material is likely sufficiently enhanced.

(Chain Transfer Agent)

The support material composition contained in the composition set for material-jet optical shaping of the present invention preferably further comprises a chain transfer agent. The chain transfer agent is not particularly limited as long as it is a compound that functions as a chain transfer agent for a radical reaction. The use of the chain transfer agent reduces the molecular weight of a cured product when the composition is irradiated with light to photocure. A support material cured product with a lowered molecular weight likely retains solubility in water even when the model material composition is mixed. For this reason, the support material cured product with a lowered molecular weight hardly remains on the surface of the photocured product of a model material during the removal treatment by water.

Preferred examples of the chain transfer agent include thiol compounds such as 2-mercaptobenzothiazole and γ-mercaptopropyltrimethoxysilane, and 2,4-diphenyl-4-methyl-pentene.

The content of the chain transfer agent is preferably 0.1 to 5 parts by mass, more preferably 0.2 to 4 parts by mass, and even more preferably 0.3 to 3 parts by mass based on 100 parts by mass of the support material composition. When the content is equal to or more than the above-mentioned lower limit value, the decrease in solubility in water is likely suppressed even when the model material composition is mixed. When the content is equal to or less than the upper limit value, the support material is likely cured and the support force is likely improved.

(Water-Soluble Organic Solvent)

The support material composition contained in the composition set for material-jet optical shaping of the present invention preferably further comprises a water-soluble organic solvent. The water-soluble organic solvent has an effect of adjusting the viscosity of the support material composition so as to be suitable for discharge by a material-jet optical shaping method.

Examples of the water-soluble organic solvent include ethylene glycol, diethylene glycol, triethylene glycol, propylene glycol, dipropylene glycol, 2-pyrrolidone, N-methyl-2-pyrrolidone, 1,2-propanediol, 1,3-propanediol, 1,2-butanediol, 1,3-butanediol, 1,4-butanediol, 2,3-butanediol, 2,2-dimethyl-1,3-propanediol, 2-methyl-1,3-propanediol, 1,2-pentanediol, 1,5-pentanediol, 2,4-pentanediol, 1,2-hexanediol, 3,5-dimethyl-3-hexyne-2,5-diol, 2,5-hexanediol, hexylene glycol, 1,6-hexanediol, 2-ethyl-1,3-hexanediol, 2,2,4-trimethyl-1,3-pentanediol, 2,5-dimethyl-2,5-hexanediol, sulfolane, 1,4-cyclohexanedimethanol, 2,2-thiodiethanol, 3-pyridylcarbinol, propylene glycol monomethyl ether, dipropylene glycol methyl ether, tripropylene glycol methyl ether, propylene glycol ethyl ether, propylene glycol n-propyl ether, dipropylene glycol n-propyl ether, tripropylene glycol n-propyl ether, propylene glycol n-butyl ether, dipropylene glycol n-butyl ether, tripropylene glycol n-butyl ether, propylene glycol t-butyl ether, dipropylene glycol t-butyl ether, dipropylene glycol t-butyl ether, propylene glycol phenyl ether, ethylene glycol methyl ether, diethylene glycol methyl ether, triethylene glycol methyl ether, ethylene glycol ethyl ether, diethylene glycol ethyl ether, triethylene glycol ethyl ether, ethylene glycol n-propyl ether, ethylene glycol n-butyl ether, diethylene glycol n-butyl ether, triethylene glycol n-butyl ether, ethylene glycol n-hexyl ether, diethylene glycol n-hexyl ether, and ethylene glycol phenyl ether. These may be used alone or two or more thereof may be used in combination.

The content of the water-soluble organic solvent is preferably 30 parts by mass or less, and preferably 5 parts by mass or more based on 100 parts by mass of the support material composition. When the content of the water-soluble organic solvent is within the above-mentioned range, the removability by water or the water-soluble solvent of the support material is likely improved without lowering the support force of the support material.

The support material composition may further comprise additives such as a surface adjusting agent and a preservation stabilizer in addition to the above components. Examples of the surface adjusting agent and the preservation stabilizer include the same compounds as the surface adjusting agent and the preservation stabilizer that may be contained in the model material composition.

When the support material composition contains a surface adjusting agent, the content thereof is preferably 0.005 to 3.0 parts by mass based on 100 parts by mass of the support material composition. When the content is equal to or more than the above-mentioned lower limit value, the surface tension of the support material composition is easily adjusted to an appropriate range. When the content is equal to or less than the above-mentioned upper limit value, generation of an undissolved material in the support material composition is suppressed and the support material composition is less likely to foam.

When the support material composition contains a preservation stabilizer, the content thereof is preferably 0.005 to 1 part by mass, and more preferably 0.05 to 0.5 parts by mass based on 100 parts by mass of the support material composition.

The viscosity of the support material composition in the present invention is preferably 1 to 500 mPa s, and more preferably 20 to 400 mPa s at 25° C. from the viewpoint of improving dischargeability from a material jetting nozzle. The viscosity can be measured using an R100 type viscometer in accordance with JIS Z8803.

In the present invention, the method for producing the support material composition is not particularly limited, and for example, the support material composition can be produced by uniformly mixing components constituting the support material composition using a mixing and stirring device or the like.

<Production Method of Optically Shaped Article>

A optically shaped article (or a three-dimensionally shaped article) can be formed from the resin composition for optical shaping of the present invention, the model material composition of the present invention, or the composition set for material-jet optical shaping of the present invention by an optical shaping method, for example, a material-jet optical shaping method. Hereinafter, a production method of an optically shaped article by a material-jet optical shaping method will be described in detail.

The production method of an optically shaped article from the model material composition or composition set for optical shaping of the present invention is not particularly limited, and examples thereof include a method comprising a step of photocuring the model material composition to obtain a model material and photocuring the support material composition to obtain a support material, and a step of removing the support material from the model material.

In the production method, for example, the optically shaped article may be produced as follows: based on three-dimensional CAD data of an article to be produced, data of a model material composition that is laminated by a material-jet method to constitute a three-dimensionally shaped article and data of a support material composition that supports the three-dimensionally shaped article under production are prepared, then slice data for discharging each composition with a material-jet 3D printer is further prepared, and after each of the model material composition and the support material composition is discharged based on the prepared slice data, photocuring treatment is repeated for each layer, and thus a optically shaped article composed of a photocured product of the model material composition (a model material) and a photocured product of the support material composition (a support material) is made.

Examples of the light that cures the model material composition and the support material composition include active energy rays such as far infrared rays, infrared rays, visible rays, near ultraviolet rays, ultraviolet rays, electron beams, α-rays, γ-rays, and X-rays. Among these, near ultraviolet rays or ultraviolet rays are preferable from the viewpoint of easiness and efficiency of curing work.

Examples of a light source include conventionally publicly-known high-pressure mercury lamps, metal halide lamps, and UV-LEDs. Among these, an LED system is preferable from the viewpoint of being capable of reducing the size of facility and requiring small power consumption. The light quantity is preferably 200 to 500 mJ/cm$^2$ from the viewpoint of the hardness and dimensional accuracy of a shaped article. When a UV-LED is used as a light source, it is preferable to use a light source having a center wavelength of 385 to 415 nm because light easily reaches a deep layer and the hardness and dimensional accuracy of a shaped article can be improved.

The thickness of each layer constituting the optically shaped article is preferably thinner from the viewpoint of shaping accuracy, but is preferably 5 to 30 μm from the balance with the shaping speed.

The resulting optically shaped article is a combination of the model material and the support material. By removing the support material from the optically shaped article, an optically shaped product, which is the model material, can be obtained. The removal of the support material is preferably performed as follows: for example, the resulting shaped article is immersed in a removal solvent capable of dissolving the support material, thereby softening the support material, and then the support material is removed with a brush or the like from the surface of the model material. As the solvent for removing the support material, water, a water-soluble solvent such as a glycol-based solvent or an alcohol-based solvent may be used. These may be used alone or two or more thereof may be used in combination.

EXAMPLES

Hereinafter, the present invention is described specifically by way of Examples, but these do not limit the scope of the present invention. In Examples, "%" and "part" are "% by mass" and "part by mass", respectively, unless otherwise specified.

Abbreviations and details of the raw materials used in Examples and Comparative Examples are shown in the following Table 1.

The linear expansion coefficients of the monomer B and the monomer C in Table 1 were measured in accordance with the following method.

[Preparation of Homopolymers of Monomer B and Monomer C and Measurement of Linear Expansion Coefficient]

To each of the monomer B and the monomer C was mixed 5% by mass of the photopolymerization initiator (D), thereby preparing compositions for measuring the linear expansion coefficients of the monomer B and the monomer C, respectively. Spacers each with a thickness of 5 mm were disposed on the four sides of the upper surface of a glass plate (trade name "GLASS PLATE", manufactured by AS ONE Corporation, 200 mm×200 mm×5 mm thickness) to divide it into rectangles each being 10 mm×5 mm in size. Each of the compositions for measurement of linear expan-

TABLE 1

| Component | Abbreviation | Component name | Tg (° C.) | Linear expansion coefficient | Specification |
|---|---|---|---|---|---|
| Monofunctional ethylenically unsaturated monomer (A) | IBOA | Isobornyl acrylate | 88 | — | Manufactured by Osaka Organic Chemical Industry Ltd. |
| | ACMO | Acryloylmorpholine | 145 | — | Manufactured by DKSH |
| | FA-511AS | Dicyclopentenyl acrylate | 120 | — | Manufactured by Hitachi Chemical Co., Ltd. |
| At least one polyfunctional ethylenically unsaturated monomer (B) having ring structure other than isocyanurate ring structure | SR833 | Tricyclodecanedimethanol diacrylate | — | 75 | Manufactured by Arkema S.A. |
| | SR540 | Ethoxylated (4) bisphenol A dimethacrylate | — | 129 | Manufactured by Arkema S.A. |
| At least one polyfunctional ethylenically unsaturated monomer (C) having isocyanurate ring skeleton | SR368 | Tris(2'hydroxyethyl)isocyanurate triacrylate | — | 61 | Manufactured by Arkema S.A. |
| | TAIC | Triallyl isocyanurate | — | 87 | Manufactured by Mitsubishi Chemical Corp. |
| | A-9300 | Ethoxylated isocyanurate triacrylate | — | 86 | Manufactured by Shin-Nakamura Chemical Co., Ltd. |
| | M-315 | Isocyanuric acid EO-modified di and triacrylate | — | 89 | Manufactured by Toagosei Co., Ltd. |
| Other polymerizable compound | Ebecryl8402 | Urethane oligomer | — | — | Manufactured by DAICEL-ALLNEX Ltd. |
| Photopolymerization initiator (D) | DAROCURE TPO | 2,4,6-Trimethylbenzoyl-diphenylphosphine oxide | — | — | Manufactured by BASF SE |
| Surface adjusting agent (silicone based) (E) | TEGO-Rad2100 | Silicone acrylate having polydimethylsiloxane structure | — | — | Manufactured by EVONIK JAPAN Co., Ltd. |
| Preservation stabilizer (F) | H-TEMPO | 4-Hydroxy-2,2,6,6-tetramethylpiperidine-N-oxyl | — | — | Manufactured by EVONIK JAPAN Co., Ltd. |

The glass transition temperature Tg of the monomer A in Table 1 was measured in accordance with the following method.

[Preparation of Homopolymer of Monomer a and Measurement of Glass Transition Temperature]

A composition for measuring the glass transition temperature (Tg) of the monomer A was prepared by mixing 5% by mass of the photopolymerization initiator (D) with the monomer A. The composition for measuring Tg was dropped into an aluminum container for measurement, and then the composition for measuring Tg was irradiated with ultraviolet rays having an integrated light quantity of 500 mJ/cm$^2$ by a metal halide lamp to cure, thereby preparing a sample for measurement. The glass transition temperature of the obtained sample for measurement was measured by a differential scanning calorimeter (DSC) under the following conditions.

(Measurement Conditions)
  Measuring apparatus: DSC 8230 (manufactured by Rigaku Corporation)
  Heating rate: 10° C./min
  Scanning temperature: 30 to 200° C.

sion coefficient was cast into the rectangles, and then, another sheet of the above-mentioned glass plate was put thereon. Next, ultraviolet rays with an integrated light quantity of 500 mJ/cm$^2$ were applied with a metal halide lamp to cure the composition. Thereafter, the cured product was released from the glass plate, affording homopolymers for measurement of the monomer B and the monomer C. Using each of the homopolymers obtained as a test piece, the linear expansion coefficient of the homopolymer of each monomer was measured in the range of 25 to 200° C. in accordance with the thermomechanical analysis method (TMA method) defined in JIS K 7197.

(1) Preparation of Resin Composition for Optical Shaping

According to each composition shown in Tables 2 and 3, the components constituting each resin composition for optical shaping were uniformly mixed using a mixing and stirring device. After stirring, the resulting mixture was subjected to suction filtration using a glass filter (manufactured by Kiriyama Glass Works Co.). Thus, the resin compositions for optical shaping of Examples 1 to 14 and Comparative Examples 1 to 4 were prepared.

(2) Evaluation of Physical Properties of Resin Composition for Optical Shaping

The viscosity of each of the resin compositions for optical shaping prepared in the Examples and Comparative Examples was measured in accordance with the following method. The results are shown in Tables 2 and 3.

[Measurement of Viscosity]

The viscosity of each of the resin compositions for optical shaping was measured under the conditions of 25° C. and a cone rotation speed of 5 rpm using an R100 type viscometer (manufactured by Toki Sangyo Co., Ltd.). The results are shown in Tables 2 and 3.

(3) Evaluation of Physical Properties of Cured Product of Resin Composition for Optical Shaping

[Preparation of Photocured Product and Measurement of Linear Expansion Coefficient]

Spacers each with a thickness of 5 mm were disposed on the four sides of the upper surface of a glass plate (trade name "GLASS PLATE", manufactured by AS ONE Corporation, 200 mm×200 mm×5 mm thickness) to divide it into rectangles each being 10 mm×5 mm in size. Each of the resin compositions for optical shaping was cast into the rectangles, and then, another sheet of the above-mentioned glass plate was put thereon. Next, ultraviolet rays with an integrated light quantity of 500 mJ/cm$^2$ were applied with a metal halide lamp as an irradiation means to cure the composition. Thereafter, the cured product was released from the glass plate to afford a test piece. Using the test piece obtained, the linear expansion coefficient of each photocured product was measured in the range of 25 to 200° C. in accordance with the thermomechanical analysis method (TMA method) defined in JIS K 7197 and evaluated according to the following criteria. The results are shown in Tables 2 and 3.

(Evaluation Criteria of Linear Expansion Coefficient)
◯: less than 100 ppm
Δ: 100 ppm or more and 150 ppm or less
x: more than 150 ppm

TABLE 2

| Component | Name | Example 1 | Example 2 | Example 3 | Example 4 | Example 5 |
|---|---|---|---|---|---|---|
| Monofunctional ethylenically unsaturated monomer (A) | IBOA | 44.8 | — | — | 44.8 | — |
| | ACMO | — | 44.8 | — | — | — |
| | FA-511AS | — | — | 44.8 | — | 44.8 |
| Polyfunctional ethylenically unsaturated monomer (B) having ring structure other than isocyanurate ring structure | SR833 | 25 | 25 | 25 | — | 25 |
| | SR540 | — | — | — | 25 | — |
| Polyfunctional ethylenically unsaturated monomer (C) having isocyanurate ring skeleton | SR368 | 25 | 25 | 25 | 25 | — |
| | TAIC | — | — | — | — | 25 |
| | A-9300 | — | — | — | — | — |
| | M-315 | — | — | — | — | — |
| Other polymerizable compound | Ebecryl8402 | — | — | — | — | — |
| Photopolymerization initiator (D) | DAROCURE TPO | 5 | 5 | 5 | 5 | 5 |
| Surface adjusting agent (E) | TEGO-Rad2100 | 0.1 | 0.1 | 0.1 | 0.1 | 0.1 |
| Preservation stabilizer (F) | H-TEMPO | 0.1 | 0.1 | 0.1 | 0.1 | 0.1 |
| Total | | 100 | 100 | 100 | 100 | 100 |
| Viscosity of resin composition for optical shaping [mPa · s] | | 63 | 69 | 80 | 92 | 41 |
| Linear expansion coefficient of photocured product [ppm] | | ◯ | ◯ | ◯ | Δ | ◯ |

| Component | Name | Example 6 | Example 7 | Example 8 | Example 9 | Example 10 |
|---|---|---|---|---|---|---|
| Monofunctional ethylenically unsaturated monomer (A) | IBOA | — | — | — | — | — |
| | ACMO | — | — | 19 | 39.8 | 39.8 |
| | FA-511AS | 44.8 | 44.8 | — | — | — |
| Polyfunctional ethylenically unsaturated monomer (B) having ring structure other than isocyanurate ring structure | SR833 | 25 | 25 | 40.8 | 5 | 50 |
| | SR540 | — | — | — | — | — |
| Polyfunctional ethylenically unsaturated monomer (C) having isocyanurate ring skeleton | SR368 | — | — | — | — | — |
| | TAIC | — | — | 35 | 50 | 5 |
| | A-9300 | 25 | — | — | — | — |
| | M-315 | — | 25 | — | — | — |
| Other polymerizable compound | Ebecryl8402 | — | — | — | — | — |
| Photopolymerization initiator (D) | DAROCURE TPO | 5 | 5 | 5 | 5 | 5 |
| Surface adjusting agent (E) | TEGO-Rad2100 | 0.1 | 0.1 | 0.1 | 0.1 | 0.1 |
| Preservation stabilizer (F) | H-TEMPO | 0.1 | 0.1 | 0.1 | 0.1 | 0.1 |
| Total | | 100 | 100 | 100 | 100 | 100 |
| Viscosity of resin composition for optical shaping [mPa · s] | | 83 | 84 | 87 | 45 | 40 |
| Linear expansion coefficient of photocured product [ppm] | | ◯ | ◯ | ◯ | ◯ | ◯ |

TABLE 3

| Component | Name | Example 11 | Comparative Example 1 | Example 12 | Example 13 | Example 14 |
|---|---|---|---|---|---|---|
| Monofunctional ethylenically unsaturated monomer (A) | IBOA | 9.8 | 70 | 20 | 20 | — |
| | ACMO | — | — | — | — | — |
| | FA-511AS | — | — | — | — | — |
| Polyfunctional ethylenically unsaturated monomer (B) having ring structure other than isocyanurate ring structure | SR833 | 5 | 12.8 | 59.8 | 15 | 48.8 |
| | SR540 | — | — | — | — | — |
| Polyfunctional ethylenically unsaturated monomer (C) having isocyanurate ring skeleton | SR368 | — | 12 | 15 | 59.8 | 46 |
| | TAIC | 80 | — | — | — | — |
| | A-9300 | — | — | — | — | — |
| | M-315 | — | — | — | — | — |
| Other polymerizable compound | Ebecryl8402 | — | — | — | — | — |
| Photopolymerization initiator (D) | DAROCURE TPO | 5 | 5 | 5 | 5 | 5 |
| Surface adjusting agent (E) | TEGO-Rad2100 | 0.1 | 0.1 | 0.1 | 0.1 | 0.1 |
| Preservation stabilizer (F) | H-TEMPO | 0.1 | 0.1 | 0.1 | 0.1 | 0.1 |
| Total | | 100 | 100 | 100 | 100 | 100 |
| Viscosity of resin composition for optical shaping [mPa·s] | | 2200 | 20 | 121 | 718 | 1015 |
| Linear expansion coefficient of photocured product [ppm] | | ○ | x | ○ | ○ | ○ |

| Component | Name | Comparative Example 2 | Comparative Example 3 | Comparative Example 4 |
|---|---|---|---|---|
| Monofunctional ethylenically unsaturated monomer (A) | IBOA | — | — | 54.8 |
| | ACMO | 48.8 | 48.8 | — |
| | FA-511AS | — | — | — |
| Polyfunctional ethylenically unsaturated monomer (B) having ring structure other than isocyanurate ring structure | SR833 | — | 46 | 25 |
| | SR540 | — | — | — |
| Polyfunctional ethylenically unsaturated monomer (C) having isocyanurate ring skeleton | SR368 | 46 | — | — |
| | TAIC | — | — | — |
| | A-9300 | — | — | — |
| | M-315 | — | — | — |
| Other polymerizable compound | Ebecryl8402 | — | — | 15 |
| Photopolymerization initiator (D) | DAROCURE TPO | 5 | 5 | 5 |
| Surface adjusting agent (E) | TEGO-Rad2100 | 0.1 | 0.1 | 0.1 |
| Preservation stabilizer (F) | H-TEMPO | 0.1 | 0.1 | 0.1 |
| Total | | 100 | 100 | 100 |
| Viscosity of resin composition for optical shaping [mPa·s] | | 170 | 31 | 48 |
| Linear expansion coefficient of photocured product [ppm] | | x | x | x |

As is apparent from the results of Tables 2 and 3, in Examples 1 to 14, in which the monomer B and the monomer C were contained at specific ratios, a photocured product of a composition for optical shaping having a low linear expansion coefficient was obtained. Among them, in Examples 1 to 10, in which 19 to 59 parts by mass of the monomer A, 5 to 50 parts by mass of the monomer B, and 5 to 50 parts by mass of the monomer C were contained based on 100 parts by mass of the resin composition for optical shaping, a photocured product of a resin composition for optical shaping having a low linear expansion coefficient was obtained, and the viscosity of the resin composition for optical shaping was less than 100 mPa s, and the resin composition for optical shaping had an appropriate viscosity applicable to a material-jet optical shaping method. That is, the resin compositions for optical shaping of Examples 1 to 10 could be used as model material compositions to be used in a material-jet optical shaping method. On the other hand, in Comparative Examples 2 to 4, in which the monomer B and/or the monomer C was not contained, the linear expansion coefficient of the obtained photocured product was high.

The invention claimed is:

1. A model material composition to be used in a material-jet optical shaping method, the model material composition comprising a polymerizable compound,
    wherein the polymerizable compound comprises, each based on 100 parts by mass of the model material composition:
    19 to 59 parts by mass of at least one monofunctional ethylenically unsaturated monomer (A);
    5 to 50 parts by mass of at least one polyfunctional ethylenically unsaturated monomer (B) having a ring structure other than an isocyanurate ring structure; and
    5 to 50 parts by mass of at least one polyfunctional ethylenically unsaturated monomer (C) having an isocyanurate ring structure,
    wherein a total amount of the polymerizable compounds contained in the model material composition is 80 to 98 parts by mass based on 100 parts by mass of the model material composition,
    wherein a homopolymer of the monofunctional ethylenically unsaturated monomer (A) has a glass transition temperature Tg of 80° C. or higher, and wherein a ratio of a total mass of the monomer B and the monomer C to a total mass of the monomer A is 0.5 to 10.

2. The model material composition according to claim 1, wherein the at least one polyfunctional ethylenically unsaturated monomer (B) having a ring structure other than an isocyanurate ring structure is a polyfunctional ethylenically unsaturated monomer having an alicyclic structure.

3. The model material composition according to claim 1, wherein a homopolymer of the polyfunctional ethylenically unsaturated monomer (B) having a ring structure other than an isocyanurate ring structure has a linear expansion coefficient of 200 ppm or less as measured at a temperature equal to or lower than a glass transition temperature of the homopolymer, in accordance with JIS K 7197.

4. The model material composition according to claim 1, wherein a homopolymer of the polyfunctional ethylenically unsaturated monomer (C) having an isocyanurate ring structure has a linear expansion coefficient of 200 ppm or less as measured at a temperature equal to or lower than a glass transition temperature of the homopolymer, in accordance with JIS K 7197.

5. The model material composition according to claim 1, further comprising 1 to 15 parts by mass of a photopolymerization initiator (D) based on 100 parts by mass of the model material composition.

6. The model material composition according to claim 1, further comprising 0.005 to 3 parts by mass of a surface adjusting agent (E) based on 100 parts by mass of the model material composition.

7. The model material composition according to claim 1, further comprising 0.05 to 3 parts by mass of a preservation stabilizer (F) based on 100 parts by mass of the model material composition.

8. A photocured product of the model material composition according to claim 5.

9. The photocured product according to claim 8, wherein a linear expansion coefficient measured at a glass transition temperature or lower in accordance with JIS K 7197 is 150 ppm or less.

10. A composition set for material-jet optical shaping comprising the model material composition according to claim 1 and a support material composition to be used together with the model material composition.

11. The model material composition according to claim 1, wherein the monomer A is a monofunctional ethylenically unsaturated monomer having a ring structure in its molecule and a total content of the monomer B and the monomer C is 35 parts by mass or more based on 100 parts by mass of the model material composition.

12. The model material composition according to claim 1, wherein the homopolymer of the monofunctional ethylenically unsaturated monomer (A) includes isobornyl (meth) acrylate, dicyclopentanyl (meth)acrylate, dicyclopentenyl acrylate, adamantly (meth)acrylate, N,N-acryloylmorpholine, N,Ndimethylacrylamide, N,N-diethylacrylamide, N-isopropylacrylamide, hydroxyethylacrylamide, and N-vinylcaprolactam.

* * * * *